US007688681B2

(12) United States Patent
Weber

(10) Patent No.: US 7,688,681 B2

(45) Date of Patent: Mar. 30, 2010

(54) ULTRASONIC ROD TRANSDUCER

(76) Inventor: Dieter Weber, Lerchenweg 2, Karlsbad (DE) 76307

(*) Notice: Subject to any disclaimer, the term of this patent is extended or adjusted under 35 U.S.C. 154(b) by 233 days.

(21) Appl. No.: 11/884,332

(22) PCT Filed: Jan. 13, 2006

(86) PCT No.: PCT/EP2006/000251

§ 371 (c)(1), (2), (4) Date: Sep. 10, 2007

(87) PCT Pub. No.: WO2006/087053

PCT Pub. Date: Aug. 24, 2006

(65) Prior Publication Data

US 2008/0212408 A1 Sep. 4, 2008

(30) Foreign Application Priority Data

Feb. 15, 2005 (DE) ...................... 10 2005 007 056

(51) Int. Cl.
*H04B 17/00* (2006.01)
*H04B 1/02* (2006.01)

(52) U.S. Cl. ...................................................... 367/165

(58) Field of Classification Search ................ 367/165; 310/325
See application file for complete search history.

(56) References Cited

U.S. PATENT DOCUMENTS

| | | | | |
|---|---|---|---|---|
| 3,689,783 | A * | 9/1972 | Williams | 310/325 |
| 3,772,538 | A | 11/1973 | Supitilov | |
| 5,200,666 | A * | 4/1993 | Walter et al. | 310/325 |
| 2003/0015218 | A1 | 1/2003 | Bran | |
| 2008/0212408 | A1* | 9/2008 | Weber | 367/165 |

FOREIGN PATENT DOCUMENTS

| | | | |
|---|---|---|---|
| DE | 2211774 A1 | | 9/1972 |
| DE | 124010 | | 2/1977 |
| WO | PCT/GB02/03284 A2 | | 1/2003 |
| WO | WO 2006087053 A1 | * | 8/2006 |

* cited by examiner

*Primary Examiner*—Dan Pihulic
(74) *Attorney, Agent, or Firm*—Leydig, Voit & Mayer, Ltd.

(57) ABSTRACT

From the foregoing, it can be seen that an ultrasonic rod transducer is provided that has a heat transfer element that is thermally well coupled to the piezoelectric transducer. It provides for the thermal resistance to the surrounding atmosphere or to the housing and thus to the bath in which rod transducer is immersed.

20 Claims, 6 Drawing Sheets

ULTRASONIC ROD TRANSDUCER

FIELD OF THE INVENTION

The present invention relates to ultrasonic rod transducers for liquid baths, and more particularly, to ultrasonic rod transducers which employ a piezoelectric operated resonator.

BACKGROUND OF THE INVENTION

To improve the cleaning effect of cleaning baths, the liquid in the bath is excited with ultrasound. So called rod transducers, which are either completely immersed or mounted with only the resonator portion extending into the bath, are used for ultrasonic excitation.

The ultrasonic rod transducer has a resonator, to which an ultrasonic head is affixed at least at one end and acts as a radiator. The head forms a housing in which a piezoelectric ultrasonic transducer is accommodated.

The electrical transducer consists of a number of piezoelectric ceramic wafers. The Curie temperature of the ceramic wafers is about 300° C. If the ceramic wafers are heated to this temperature or higher, the piezoelectric effect vanishes irreversibly.

If the piezoelectric transducers are intended to be used in permanent operation, a distinct safety margin away from the Curie temperature must be maintained. Usually, the temperature at the surface of the ceramic transducer must not exceed about 150° C. Thus, if the bath temperature is about 130° C. a permissible temperature overage of only 20° C. remains.

Piezoelectric transducers made of ceramic are highly efficient. Still, the supplied electrical energy is not completely converted to ultrasonic energy, but rather in part, also results in heating of the transducer. The ultrasonic energy to be generated with the transducer thus is limited by the overtemperature of the transducer.

In known devices, the piezoelectric transducer is cooled essentially only by the mechanically coupled resonator, which consists of titanium. Titanium is a poor conductor of heat. There is practically no other cooling, since by reason of ultrasonic technology the housing of the head is filled with air, which forms an extremely poor conductor of heat, so that the heat, in practical terms, is not removed through the wall of the housing.

Based on the foregoing, the need existed for a more efficient ultrasonic transducer that can generate greater ultrasonic energy.

OBJECTS AND SUMMARY OF THE INVENTION

The ultrasonic rod transducer according to the invention has a resonator to which the piezoelectric transducer is ultrasonically coupled via a coupling element. The coupling element in part at the same time forms a part of the wall of the housing. The attachment of the housing or the housing wall is situated at an oscillation node so that ultrasonic energy is exclusively input into the resonator, while the housing itself remains practically free of ultrasound. The piezoelectric transducer, together with the attachment device, has a link at the coupling device of about $\lambda/4$ and thus is too compact to be able to give off significant heat.

In accordance with the invention, therefore, a heat transfer element is coupled to the piezoelectric transducer. According to one solution the heat transfer element is designed so that it forms a very narrow air gap with the inner wall of the housing. The narrower the air gap is, the smaller the thermal resistance of this air layer will be, i.e., the more heat that can be transferred from the piezoelectric transducer to the housing and thus to the bath.

According to another solution, a heat transfer element that acts as a cooling element in the form of an aerated housing is created. The latter arrangement is possible if the transducer is situated outside of the bath, which occasionally is desirable.

The length of the heat transfer element in the area that is a part of the acoustic path is chosen so that the acoustic conditions are not disrupted by it. For example, the transfer element can have a length of $\lambda/2$, where it is immediately then connected to a front face of the piezoelectric transducer. In this design, the heat transfer element can have a cylindrical shape or a prismatic shape, where the cross section is expediently star-shaped in order to obtain a surface that is as large as possible, through which heat can be given up to the housing and thus to the bath.

Another possibility is to use a cup as a heat transfer element. For example, in the case of such cup the bottom is formed from the usual polished steel disk, which lies between a central nut and the piezoelectric transducer, to connect them mechanically.

The heat transfer element does not have to be arranged only at the end of the piezoelectric transducer that is away from the coupling section. It has been found that the piezoelectric transducer does not reach its maximum temperature immediately in the area of the end away from the resonator, but rather at a smaller distance from it. For this reason, it is advantageous to fit the heat transfer element into the piezoelectric transducer. For this purpose, the heat transfer element again has a length of $\lambda/2$.

The individual approaches with regard to surface design, insertion or cup shaped design, or through-design can be effected in diverse ways. In the case of a housing design for the resonator head through which air can pass, it is advantageous if the heat transfer element has a large surface area, and the surface that serves for cooling is expediently directed so that it lies parallel to the air flow path because of the effect of convection.

Other objects and advantages of the invention will become apparent upon reading the following detailed description and upon reference to the drawings, in which:

Figure 1:
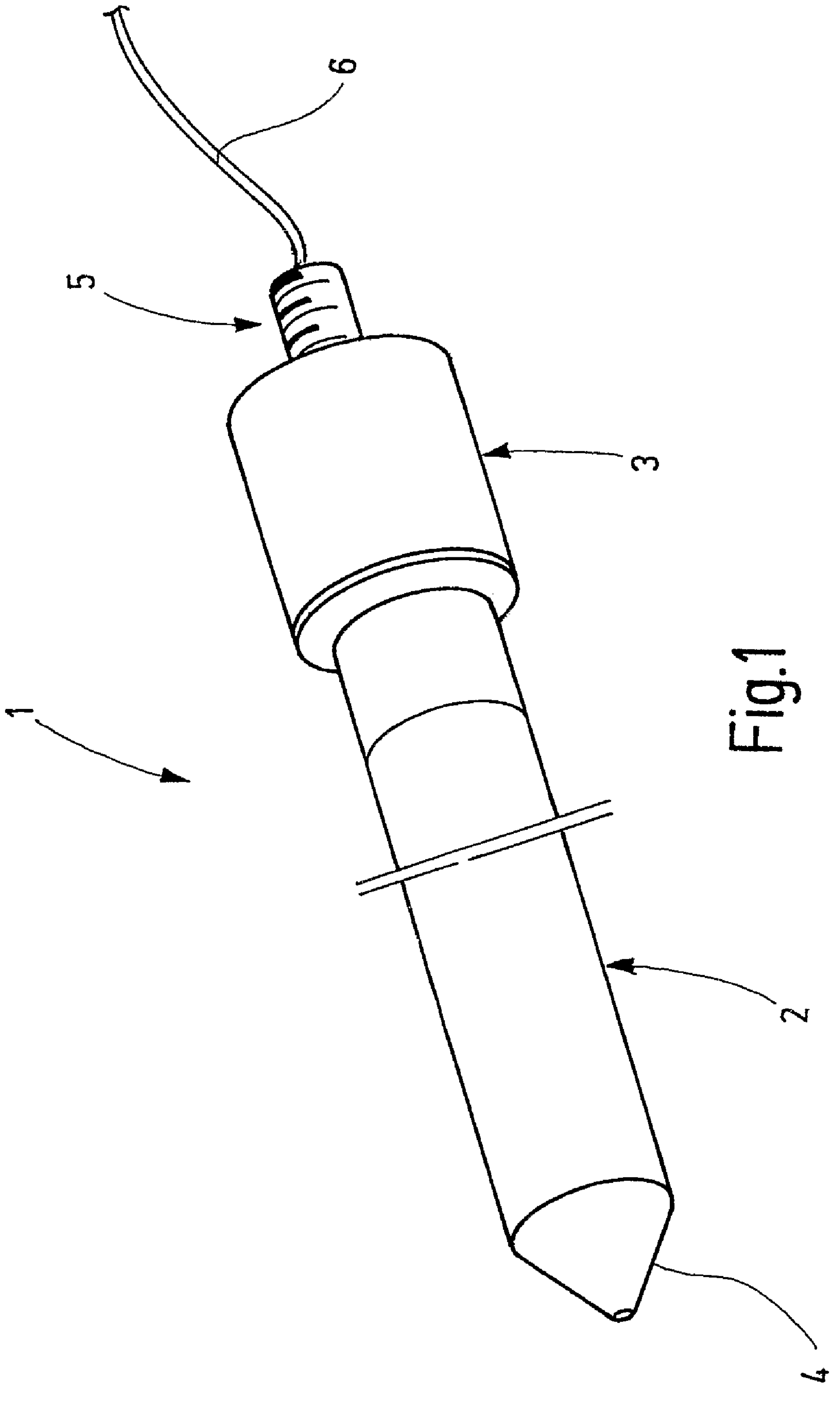
FIG. 1 is a perspective of an illustrative ultrasonic rod transducer in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention. Indeed, in a thorough reading of the description of the figures it will become clear that a number of modifications that result from the relevant requirements are possible. In addition, a number of combinations of the disclosed characteristics are possible. To describe every conceivable combination would unnecessarily increase the size of the description of the figures.

DESCRIPTION OF THE PREFERRED EMBODIMENTS

Referring now more particularly to FIG. 1 of the drawings, there is shown an illustrated ultrasonic rod transducer 1 in accordance with the invention. The ultrasonic rod transducer 1 has a resonator 2 and a head 3 connected to the resonator 2. The resonator 2 is cylindrical over its length with constant diameter. At the end away from head 3 there is a conical tip 4. The head 3 is provided with a threaded tubular stem 5 through which passes an electrical cable 6, via which electrical energy is supplied to head 3.

Figure 2:
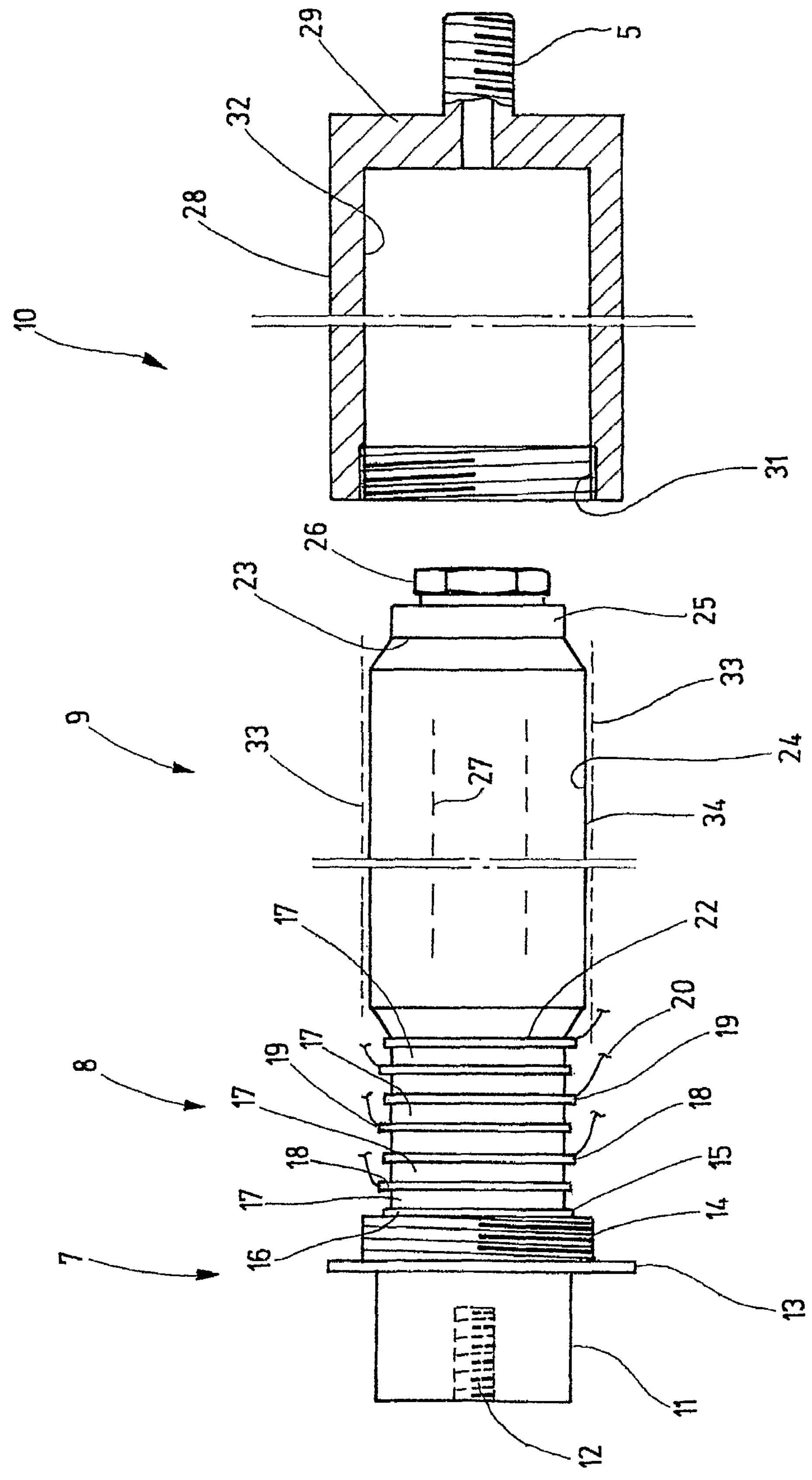
FIG. 2 is an enlarged exploded longitudinal section of the head of the rod transducer shown in FIG. 1.

Head 3, as best shown in FIG. 2, includes a connecting element 7, a piezoelectric transducer 8, a heat transfer element 9, and a cup-shaped housing cap 10. The connecting element 7 is a one-piece body, preferably made of titanium, having a cylindrical extension 11, the outside diameter which corresponds to the diameter of resonator 2. In the cylindrical extension 11 there is a coaxial drilled pocket 12 formed with internal threads. The resonator 2 is affixed to the connection element by means of the pocket 12.

The extension 11 of connection element 7 has a locating flange 13 with a threaded extension 14. The threaded extension 14 is tubular and surrounds a stem 15 which is affixed to the cylindrical extension 11.

A sort of membrane is formed between stem 15 and threaded extension 14 in order to decouple flange 13 or threads 14 from the oscillations that are fed to the extension 11 from the piezoelectric transducer 8. The connecting element 7 preferably is machined from a solid blank of titanium and is thus one-piece.

Stem 15 which is coaxial to extension 11 forms a planar surface 16 on which the piezoelectric transducer 8 lies. In the illustrated embodiment, the piezoelectric transducer 8 is composed of a total of 6 piezoelectric ceramic wafers 17, between which electrodes 18 are inserted. Electrodes 18 are each provided on one side with a terminal 19 to which conductors 20 are connected. In this case, three of the terminals 19 extend upwardly and three extend downwardly (FIG. 2). The terminals 19 that are on the same side in each case are connected electrically in parallel, so that from the electrical standpoint a dipole is formed, to which a feed or excitation A.C. voltage is fed at a frequency of usually greater than 25 kHz.

Both the ceramic wafers 17 and the wafer shaped electrodes 18 are wafer shaped rings with planar face surfaces. The electrode 18 lying furthest to the right in FIG. 3 forms the right end face of the piezoelectric transducer 8, while the ceramic disk 17 lying furthest to the left, which lies directly against stem 16, is the left end face. As can be seen, the piezoelectric transducer 8 is essentially cylindrical with plane end face surfaces.

The heat transfer element 9 is designed as a cylindrical tube with plane face ends 22, 23 and an outer cylindrical surface 24. On the side of the heat transfer element 9 that is farther from the piezoelectric transducer 8 there is a friction-reducing steel disk 25, which is pressed against piezoelectric transducer 8 by a nut 26. Nut 26 is screwed onto a threaded stem 27, indicated by dashed lines, which is anchored at the other end in stem 16 of the connecting element 7. Both the threaded stem 27 and the nut 26 preferably are made of titanium, while the heat transfer element 9 preferably is made of aluminum. As a consequence of this arrangement the electrode 18 that is furthest to the right, as viewed in FIG. 2, is an electrode that at the same time also feeds the ceramic wafer 17 that is farthest to the left.

Between the two ends 22, 23, the heat transfer element 9 has an acoustic length of λ/2. The length of the piezoelectric transducer 8, including disk 25, nut 26 and stem 16, which goes up to the wall of the housing, has a length of λ/4. The right end face of nut 26 thus lies at an antinode at resonance frequency.

Housing cap 10 is, as shown, cup-shaped and is composed of a cylindrical side wall or collar 28 and a cup bottom 29, from which the threaded stem 5 projects. At its opposite free end cylindrical the side wall 28 is formed with internal threads 31, which are screwed into engagement with the threaded extension 14 in the assembled state.

The side wall 28 forms a cylindrical inner wall 32 of the housing. The diameter defined by the inner housing wall 32 is slightly greater than the outer diameter of the outer circumferential surface 24 of heat transfer element 9. In assembled state, the inner wall 32 of the housing is in a position as illustrated in FIG. 2 by the dashed lines 33. Thus together with the outer circumferential surface 24, the inner wall 32 forms a narrow cylindrical gap 34 with a thickness between 0.5 and 5 mm along the length of the transfer element 9. By reason of such narrow gap, the thermal resistance to the outside of housing 10 is greatly reduced.

As can also be seen from the figure, the maximum outer diameter of piezoelectric transducer 8, including the projecting terminals 19 is less than the outer diameter of heat transfer element 9 or the inner diameter of the inner wall 32. In order to lead the electrical conduits past the heat transfer element 9, it is formed with two lengthwise slots, which cannot be seen in the view as depicted in FIG. 2. The connecting cable 6 passes through the tubular threaded stem 5.

When the ultrasonic rod transducer 1 is outfitted with the head 3, as shown in FIG. 2, is in operation, heat arises in the piezoelectric transducer 8. This heat is in part dissipated via the stem 15 and the resonator 2 that is connected to the extension 11 into the bath. In this way the left end of the piezoelectric transducer 8 experiences a certain amount of cooling. The right end gives up its heat to the heat transfer element 9. The heat transfer element 9 in the form of the aluminum tube conducts the heat through the narrow air gap 34 to the side wall 28 of the housing cup 10 and from there into the bath.

Therefore the right end of the piezoelectric transducer 8 experiences considerably better cooling than with prior art transducers. In the prior art, then right end would be cooled only to the extent that fastening bolts 27, which are poor heat conductors, could transfer heat in the direction of the resonator 2. Through the use of the heat transfer element 9, the housing cup 10 additionally serves to transfer the heat from the piezoelectric transducer 8 into the bath.

Figure 3:
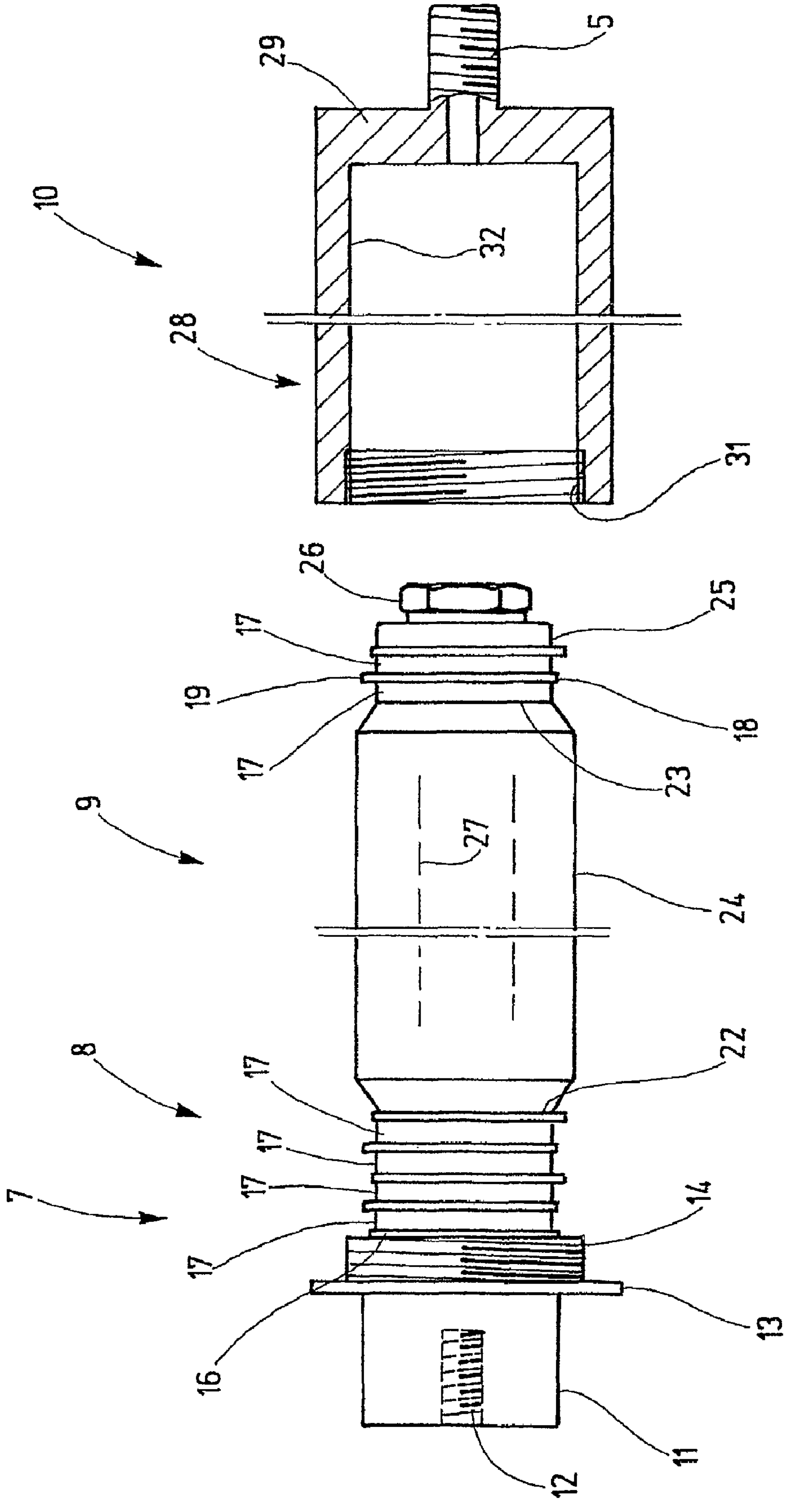
FIG. 3 is an enlarged longitudinal section, similar to FIG. 2, of an alternative embodiment of a rod transducer head.

Since the ceramic wafers 17 are not good heat conductors, the arrangement as depicted in FIG. 2 will consequently experience heating in a region lying between the two face ends of the piezoelectric transducer. It is advantageous if heat transfer element 9 is inserted into piezoelectric transducer 8, as depicted in FIG. 3. As can be seen in this case, a total of four ceramic disks 17 are arranged between heat transfer element 9 and connecting element 7, while two ceramic disks 17 are arranged between heat transfer element 9 and spacer disk 25. By this arrangement, the right end face of the piezoelectric transducer 8 is cooled via nut 26 and bolt 27, the intermediate part is cooled with the assistance of heat transfer element 9 in the direction toward housing 10, and the left end of the piezoelectric transducer 8 is cooled via the connection element 7 to the resonator 2.

In the embodiments of FIGS. 2 and 3, the thermal resistance is determined by the area of the annular gap 34 and its thickness. The thermal resistance is inversely proportional to the area and thickness of the gap. The thickness of the gap cannot be reduced below a certain minimum dimension by reason of manufacturing limitations without the danger that the heat transfer element 9 will contact inner side 32, which must be absolutely avoided since otherwise ultrasonic energy will be coupled into and through the housing 10. There are also limits with regard to the area of the gap, because of limitations in the size of the head.

Figure 4:
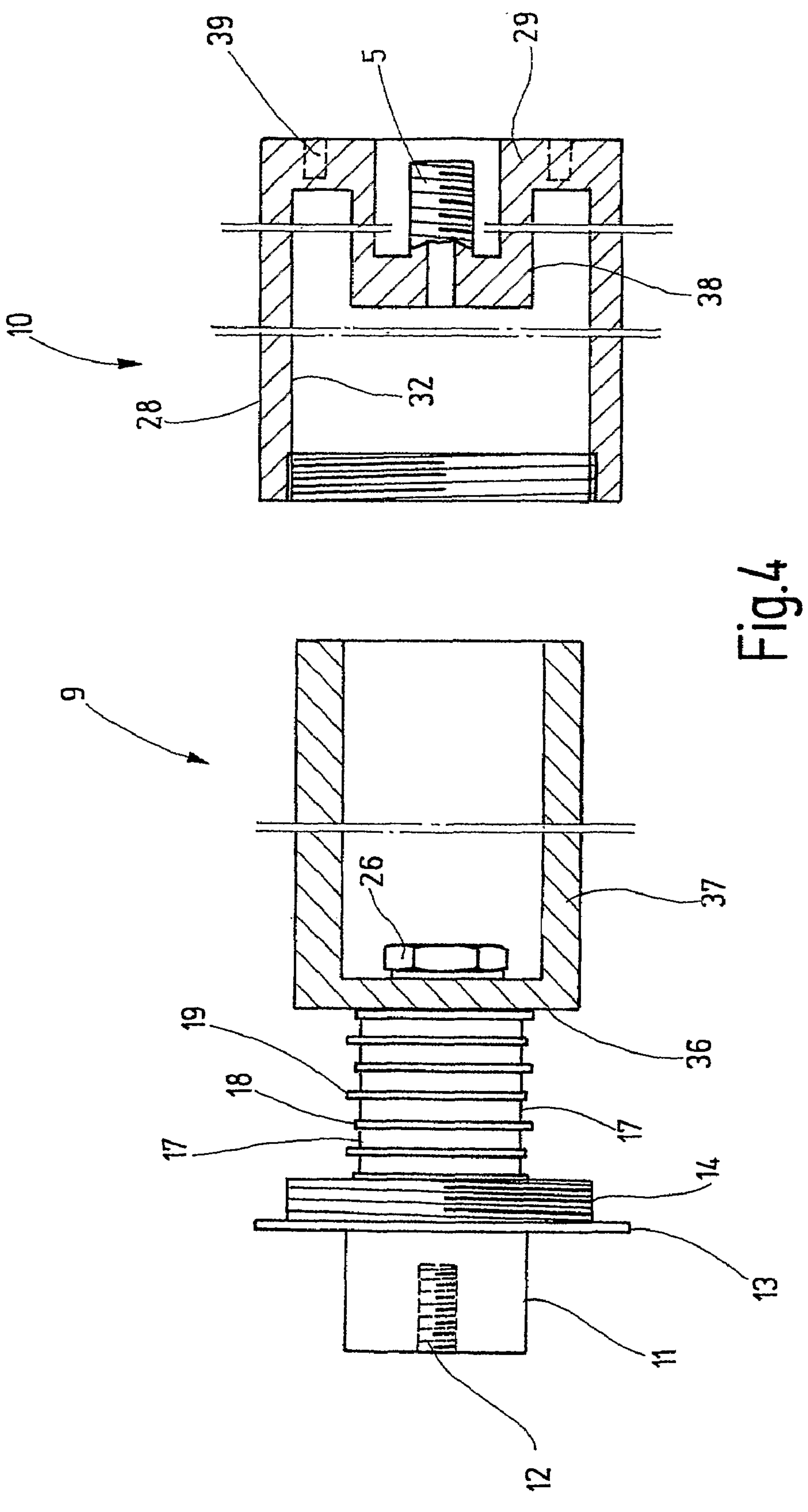
FIG. 4 is an exploded longitudinal section, similar to FIGS. 2 and 3, of still another alternative embodiment of a rod transducer head with a cup shaped heat transfer element.

An increase of the cooling area also can be achieved with the embodiment as depicted in FIG. 4. In this case, the heat transfer element 9 has the shape of a cup with a bottom 36 and side wall 37. The side wall 37 of the cup extends away from piezoelectric transducer 8, i.e., to the right in FIG. 4. The bottom 36 lies between the right end of piezoelectric transducer 8 and the central securing nut 26. Bottom 36 preferably consists of a polished steel disk.

In the embodiment of FIG. 4, it is not necessary to make the heat transfer element 9, bottom 36 and side wall 37 in a single piece. It is sufficient if it is ensured that the thermal resistance at the transition from bottom 36 to side wall 37 is small by comparison with the thermal resistance that the heat transfer element 9 exhibits toward housing 10.

The side wall 37 is cylindrical both outside and inside, i.e., it bounds a cylindrical space. To obtain the desired large heat transfer area, the housing cup, in a departure from the previous embodiment, is provided with an inward projecting cylindrical stem 38. Stem 38 is designed as a hollow structure so that the bath liquid can circulate within it.

In assembled state, the side wall 28 of housing cup 10 forms a small cylindrical gap 34 as in the embodiments of FIGS. 2 and 3. Another cylinder gap with a similar small width exists between the cylindrical inner wall of the cup 37 and stem 38. In this case, the cup shaped heat transfer element 9 is capable of removing heat from the housing cup 10, and from there, into the bath both at the outside and at the inside the side wall 37.

Figure 5:
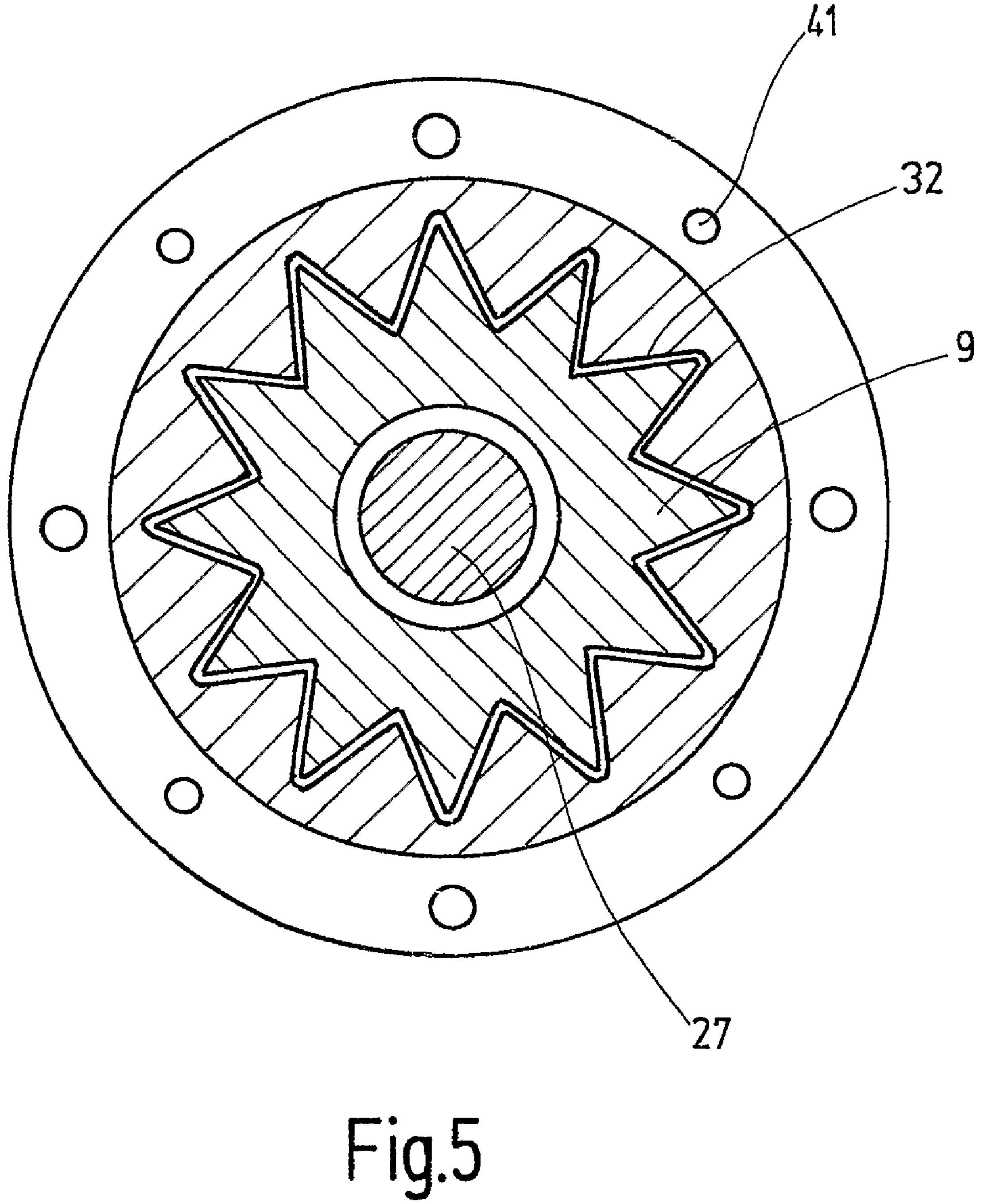
FIG. 5 is an enlarged vertical section of a rod transducer head with a star shaped heat transfer element and comparable shaped housing.

Another alternate embodiment for increasing the area of the air gap between the heat transfer element 9 and the cup shaped housing 10 is illustrated in FIG. 5. While in the previous embodiments the heat transfer element 9, apart from the slots for electrical connections, is largely rotationally symmetrical, the heat transfer element 9 depicted in FIG. 5 has a star-shaped cross section. FIG. 5 shows a section through head 3 at a right angle to the lengthwise axis or parallel to the axis along which the ultrasonic waves propagate. The central tightening bolt 27 and the star-shaped heat transfer element 9 as depicted in FIG. 5, are similar to being formed of an annular ring with triangular points projecting from the ring.

The side wall 28 of housing 10 has an inner wall 32 that is made with a complementary star shape. Such a structure can be produced, for example, by machining or by stamping from the appropriate sheets.

Instead of being screwed together via threads 14 and threads 31, as shown in FIG. 2, a connection is made via connecting rods that pass through drilled apertures 41. The apertures 41, which line up with each other, are provided both on a projecting shoulder of the bottom 29 of housing 10 and in flange 13.

In the embodiments of FIGS. 2-5, the ultrasonic rod transducers can be completely immersed in the bath. In that case, the head 3 is also situated in the bath.

Figure 6:
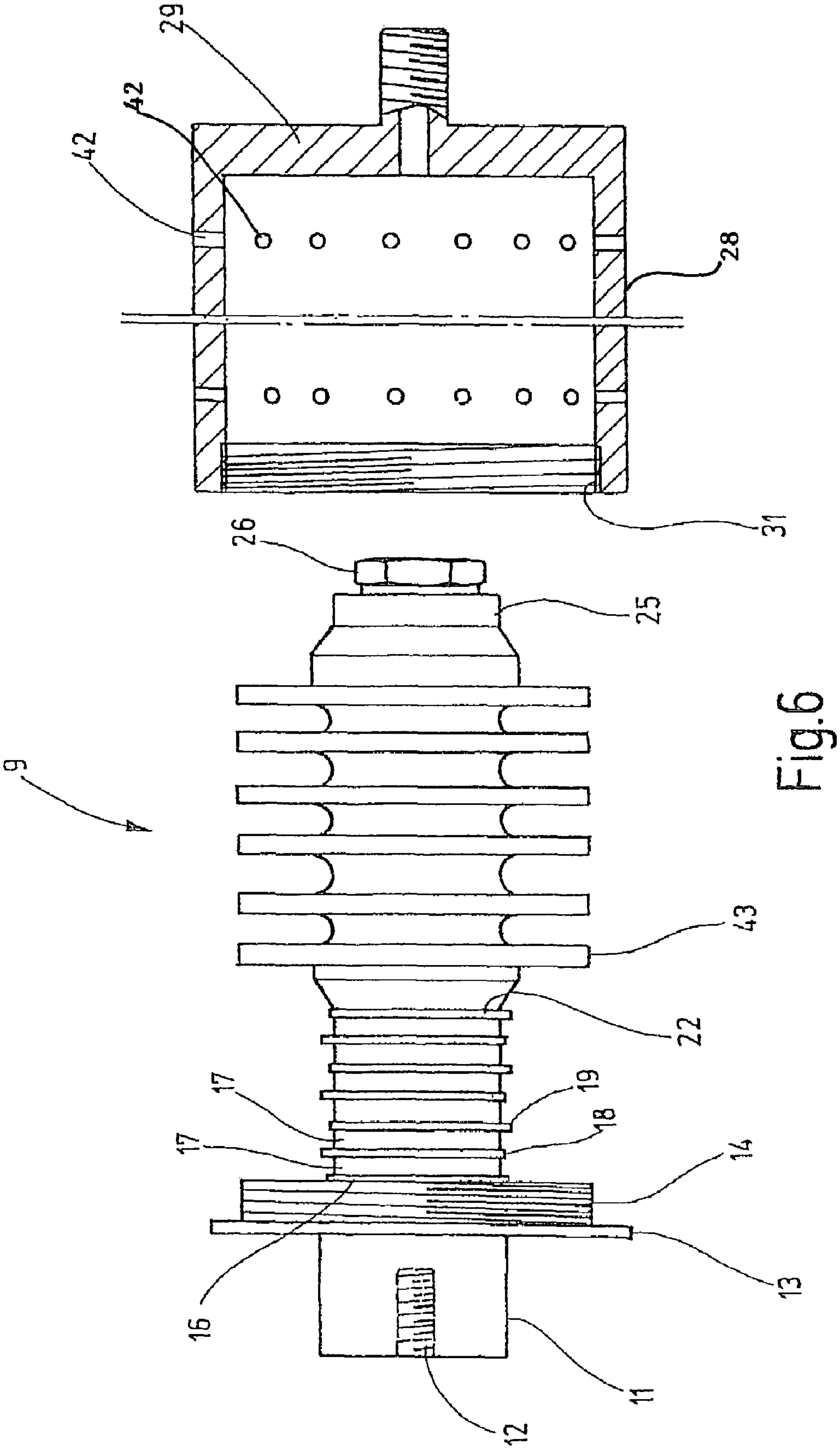
FIG. 6 is an exploded section of another alternative embodiment of a rod transducer head having a transfer element with cooling fins.

FIG. 6 shows an embodiment of an ultrasonic rod transducer 1, the head 3 of which is situated outside of the bath. The head 3 is affixed to the container wall by flange 13, and the housing 10 is situated in the free atmosphere. The further description can be limited to the differences with the previous embodiments.

In order to achieve a good cooling effect, the side wall 27 of the housing cup 10 is provided with a number of air holes 42 through which the outside atmosphere can circulate. To cool the piezoelectric transducer 8 better, a heat transfer element 9 that has a number of cooling fins 43 on its outside periphery. In this embodiment, it is not important for the gap between the heat transfer element and the housing 10 to be as small as possible. Instead, it is important to dissipate as much heat as possible via the cooling fins 43 to the air circulating through air holes 42.

The heat transfer element 9 in the embodiment of FIG. 6 is arranged in the same way as in the embodiment of FIG. 1. It also can be centrally positioned in the piezoelectric, transducer 8 consistent with FIG. 2. The length of the heat transfer element 9 in the axial direction is again chosen so that the antinode of the standing wave is situated at the end of the tightening nut 26, while the transfer position through the wall that is formed in the connecting element 7 lies at the position of the oscillation node. The cooling fins in the embodiment of FIG. 6 are only schematically represented. It is understood that the cross sectional design and diameter of the cooling fins 43 also are dimensioned according to acoustic technology in order to avoid breakage due to the induced acoustic oscillations.

From the foregoing, it can be seen that an ultrasonic rod transducer is provided that has a heat transfer element that is thermally well coupled to the piezoelectric transducer. It provides for the thermal resistance to the surrounding atmosphere or to the housing and thus to the bath in which rod transducer is immersed.

The invention claimed is:

1. An ultrasonic rod transducer (1) for generation of ultrasound in liquids comprising:

- a housing (10, 11) that bounds an inner space and has an outer wall (28, 29) with an inner side (32) facing the inner space,
- a piezoelectric transducer device (8) having two end faces and which is disposed in said housing (10),
- a resonator (2) situated outside of the housing (10, 13), a connecting element (7) for connecting said transducer device (8) to said resonator (2),
- a heat transfer element (9) thermally connected to said piezoelectric transducer (8) and having an outer surface (24) that extends adjacent to said inner side (32) of said outer wall (28) to form a gap (34) of between 0.5 mm and 5 mm through which heat of the piezoelectric transducer (8) is transferred to the outer housing wall (28); and
- said heat transfer element (9) having an acoustical length of $\lambda/2$ in a direction parallel to the axis of oscillation of the piezoelectric transducer (a).

2. The ultrasonic rod transducer of claim 1 in which said inner space has a cylindrical cross section.

3. The ultrasonic rod transducer of claim 1 in which said heat transfer element (9) has a cylindrical outer side.

4. The ultrasonic rod transducer of claim 2 in which said heat transfer element (9) has a prismatic shape cross section.

5. The ultrasonic rod transducer of claim 2 in which said heat transfer element (9) has a star shaped cross section.

6. The ultrasonic rod transducer of claim 1 in which said inner space has a non-cylindrical approximately star-shaped prismatic cross section.

7. The ultrasonic rod transducer of claim 1 in which said heat transfer element has a generally star-shaped cross section consisting of a central area and arms projecting from the central area.

8. The ultrasonic rod transducer of claim 7 in which said arms have similar shapes.

9. The ultrasonic rod transducer of claim 8 in which said arms have a triangular cross section.

10. The ultrasonic rod transducer of claim 1 in which said housing (10) has a cylindrical outer surface (28).

11. The ultrasonic rod transducer of claim 1 in which said housing (10) has a cylindrical cup shape (28, 29).

12. The ultrasonic rod transducer of claim 1 in which said connecting element (7) has a shoulder (13, 14) having a diameter greater than the transverse width of said inner space.

13. The ultrasonic rod transducer of claim 1 in which said piezoelectric transducer device (8) is formed of a plurality of adjacently positioned piezoelectric wafers (17) between which electrodes (18) are disposed.

14. The ultrasonic rod transducer of claim 1 in which said piezoelectric transducer device (8) had two face ends and said heat transfer element (9) is arranged at one of said face ends.

15. The ultrasonic rod transducer of claim 1 in which said piezoelectric transducer device (8) has two segments which are acoustically connected in succession to each other, and said heat transfer element (9) is disposed between said segments.

16. The ultrasonic rod transducer of claim 1 in which said heat transfer element (9) has a cup shape in which a bottom (36) of the cup-shaped heat transfer element (9) is acoustically and thermally coupled to a face side of the piezoelectric device (8).

17. The ultrasonic rod transducer of claim 1 in which said connecting device (7) is at least in part outside of said housing (10, 13).

18. An ultrasonic rod transducer (1) for generation of ultrasound in liquids comprising:

a housing (10, 11) having an outer wall (28, 29) with an inner side (32) that defines and faces a prismatic inner space, a piezoelectric transducer device (8) having two end faces and which is disposed in said housing (10), a resonator (2) situated outside of the housing (10, 13), a connecting element (7) for connecting said transducer device (8) to said resonator (2), a heat transfer element (9) thermally connected to said piezoelectric transducer (8) and having at least one surface (24) that extends adjacent to said inner side (32) of said outer wall (28) to form a gap (34) through which heat of the piezoelectric transducer (8) is transferred to the outer housing wall (28).

19. An ultrasonic rod transducer (1) for generation of ultrasound in liquids comprising:

a housing (10, 11) that bounds an inner space and has an outer wall (28, 29) with an inner side (32) facing the inner space, a piezoelectric transducer device (8) having two end faces and which is disposed in said housing (10), a resonator (2) situated outside of the housing (10, 13), a connecting element (7) for connecting said transducer device (8) to said resonator (2), a heat transfer element (9) thermally connected to said piezoelectric transducer (8) and having at least one surface (24) that extends adjacent to said inner side (32) of said outer wall (28) to form a gap (34) through which heat of the piezoelectric transducer (8) is transferred to the outer housing wall (28), said heat transfer element (9) having a cup shape that defines an inner space with a bottom (36) of the cup-shaped heat transfer element (9) acoustically and thermally coupled to a side face of the piezoelectric device (8), and said housing (10,13) having a recess (38) that fits into the inner space of the cup-shaped heat transfer element (9) to form a narrow gap therebetween.

20. The ultrasonic rod transducer of claim 1 in which the gap (34) is formed in sealed relation to an environment outside the transducer.

* * * * *